April 3, 1928.                     W. R. STRICKLAND                     1,664,713
                                    PROPELLER SHAFT
                                   Filed Feb. 21, 1927

William R. Strickland, Inventor

By Blackmore, Spencer & Hitt
                              Attorneys

Patented Apr. 3, 1928.

1,664,713

UNITED STATES PATENT OFFICE.

WILLIAM R. STRICKLAND, OF DETROIT, MICHIGAN, ASSIGNOR TO GENERAL MOTORS CORPORATION, OF DETROIT, MICHIGAN, A CORPORATION OF DELAWARE.

PROPELLER SHAFT.

Application filed February 21, 1927. Serial No. 169,966.

This invention relates to improvements in propeller shafts used in connection with motor vehicles.

The present propeller shafts are subject to whipping and objectionable effects due to backlash and to overcome these effects a flexible shaft is necessary. The cross-section of this shaft has its limits, the controlling factor being the requisite diameter necessary to prevent whipping and by providing a relatively large diameter the damaging effect of this action is prevented. A shaft which is very stiff torsionally, is also necessary and such a shaft is disclosed in the present invention. It is one of the objects of the invention to construct a propeller shaft which will give torsionally but will be stiff enough to prevent whipping.

It is a further object of the invention to construct a shaft which will be flexible and will lessen the injurious effect caused by whipping and backlash.

The novel shaft of the present invention is composed of an inner shaft of relatively small diameter preferably made of high carbon spring steel having a plurality of enlargements (preferably three in number) along its length with preferably one at either end and a third at the middle. Around this inner shaft there is disposed an outer hollow shaft of relatively large diameter having fixed on its interior a plurality of bushings (preferably three in number) to correspond to the enlargements of the inner shaft.

At the transmission end the enlargement and bushing are rigidly secured together both by welding and by a pin passing through the outer shaft, through the bushing and into the inner smaller shaft. The remaining connections are loose, that is, play is allowed between the bushing and its corresponding enlargement giving a journaled connection. The enlarged portion at the centre and its corresponding bushing acts as a means for steadying the flexible shaft and thereby prevents whipping.

The invention is disclosed in the accompanying drawing in which.

Figure 1:
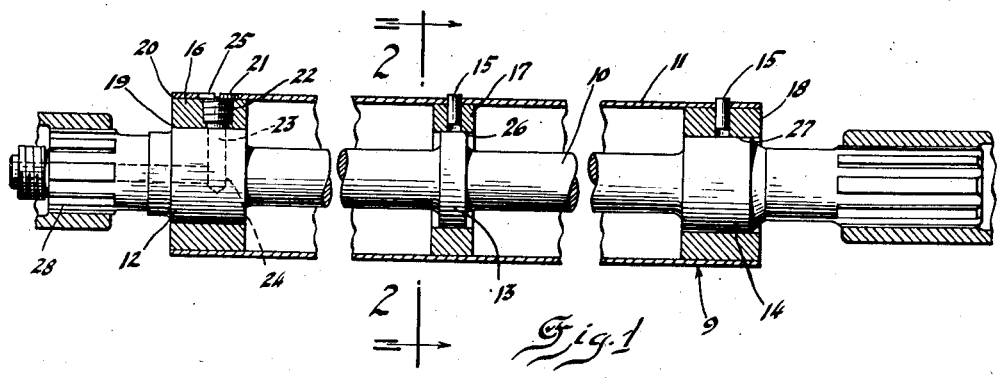
Figure 1 is a longitudinal sectional view of the novel shaft with portions broken away for purposes of clearer illustration.
Figure 2:
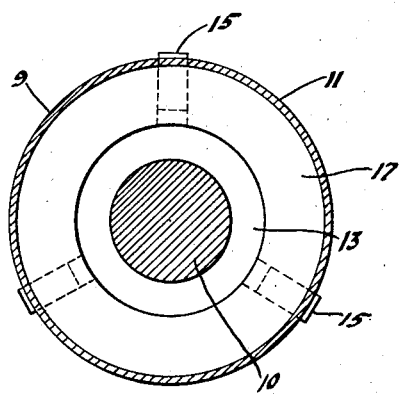
Figure 2 is a section on line 2—2 of Figure 1 looking in the direction of the arrow.

Referring to Figure 1, the inner shaft is designated at 10, the outer shaft at 11 while 9 indicates the shaft as a whole. The inner shaft has three enlargements, 12, 13 and 14, the enlargements 12 and 14 at the ends being preferably considerably broader than enlargement 13 at the center. While three enlargements are shown, it is obvious that any convenient number may be used.

Corresponding to these enlargements the outer shaft has rigidly secured therein by means of the pins 15, a plurality of bushings 16, 17 and 18 corresponding to the enlargements 12, 13 and 14, respectively, on the inner shaft. Preferably at the transmission end 28 of the shaft the bushing 16 is secured to the enlargement 12 at the surface 19 by welding and the bushing is also secured by welding at the surface 20 to the outer shaft 11. To more rigidly secure the shaft 11, bushing 16 and enlargement 12 together there is provided a pin 21 having a portion 22 threaded into the bushing 16 and a shank 23 entering the opening 24 in the inner shaft. The head 25 is enlarged and seats within a correspondingly shaped opening in the shaft 11.

The contact surfaces at 26 and 27 between the central and end bushing and enlargement are not rigid ones but sufficient play is allowed to permit the outer shaft to turn with reference to the inner one. This will allow for the flexibility in the shaft and will tend to remove the objectionable effect of backlash. The bearing at the center between the bushing 17 and the enlargement 13 is for the purpose of steadying the shaft and preventing whipping.

I claim:

1. A drive shaft for motor vehicles, comprising an inner shaft, a plurality of enlargements on said shaft, an outer shaft spaced from said inner shaft, and means on said outer shaft engaging said enlargements.

2. The combination of claim 1, said means comprising bushings.

3. The combination of claim 1, said means comprising bushings one of which is rigidly secured to its respective enlargement.

4. The combination of claim 1, said means comprising three bushings, positioned at both ends and the center with one end bushing rigidly secured to its respective enlargement.

5. The combination of claim 1, said means comprising two end bushings one of which is loose and the other rigid with its respective enlargement and a third central bushing movably mounted with respect to its enlargement.

6. A drive shaft for motor vehicles comprising an inner shaft, a plurality of enlargements on said shaft, an outer shaft spaced from said inner shaft, a plurality of bushings in said outer shaft conforming to said enlargements, a rigid connection between one bushing and its corresponding enlargement, and loose connections between the remaining bushings and enlargements.

7. The combination of claim 6, said rigid connection being at the transmission end and one of said loose connections at the center of the shaft.

8. The combination of claim 6, the end enlargements being considerably broader than the intermediary enlargement.

In testimony whereof I affix my signature.

WILLIAM R. STRICKLAND.